United States Patent [19]

Kitamura et al.

[11] 4,212,056
[45] Jul. 8, 1980

[54] INVERTER APPARATUS

[75] Inventors: Hiroyuki Kitamura, Yokohama; Yorio Hosokawa; Katsumi Fukasawa, both of Kawasaki, all of Japan

[73] Assignee: Tokyo Shibaura Denki Kabushiki Kaisha, Kawasaki, Japan

[21] Appl. No.: 943,458

[22] Filed: Sep. 18, 1978

[30] Foreign Application Priority Data

Sep. 20, 1977 [JP] Japan .................. 52-112795

[51] Int. Cl.$^2$ .................. H02P 13/20; H02P 5/40
[52] U.S. Cl. .................. 363/96; 363/98; 363/138; 318/801; 318/808; 318/811
[58] Field of Search .................. 363/27–28, 363/79–80, 96–98, 135–138; 318/798–801, 807–808, 811

[56] References Cited

U.S. PATENT DOCUMENTS

| 3,577,052 | 5/1971 | Bauer | 318/798 |
|---|---|---|---|
| 3,860,858 | 1/1975 | Nola | 318/801 |
| 3,887,853 | 6/1975 | Klein et al. | 318/801 |
| 3,912,993 | 10/1975 | Bereisa, Jr. | 318/801 |
| 4,002,958 | 1/1977 | Akamatsu | 318/801 X |
| 4,048,554 | 9/1977 | Stich | 363/138 X |
| 4,054,818 | 10/1977 | Risberg | 363/138 X |

Primary Examiner—J. D. Miller
Assistant Examiner—Peter S. Wong
Attorney, Agent, or Firm—Stevens, Davis, Miller & Mosher

[57] ABSTRACT

In an inverter apparatus of the type comprising a plurality of thyristors connected between a DC source and an AC load, a control circuit for sequentially turning ON and OFF the thyristors according to a predetermined sequence, and a reverse bias circuit including a pair of power transistors respectively connected in series with the DC source and ON-OFF controlled by the control circuit for applying a reverse bias to the thyristors to effect simultaneous commutation thereof, and a pair of diodes connected across the DC source, there are provided a second thyristor connected between the plurality of thyristors and the power transistors and turned ON at the time of commutation of the plurality of thyristors by the control circuit and a reactor connected in parallel with the second thyristor.

12 Claims, 19 Drawing Figures

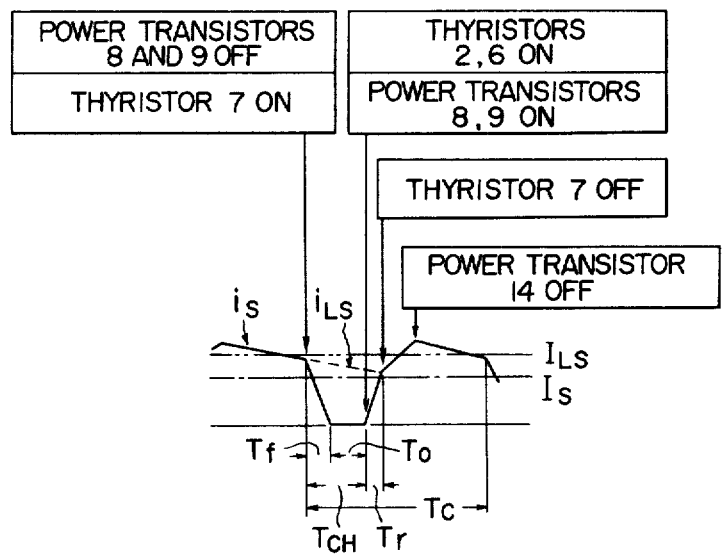
F I G. 4
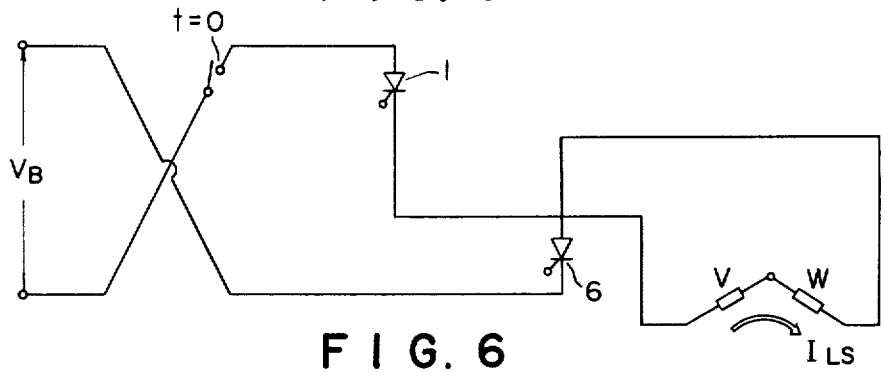
F I G. 5
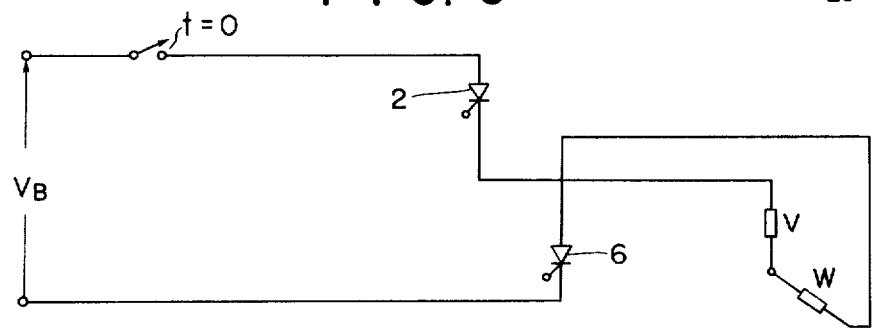
F I G. 6

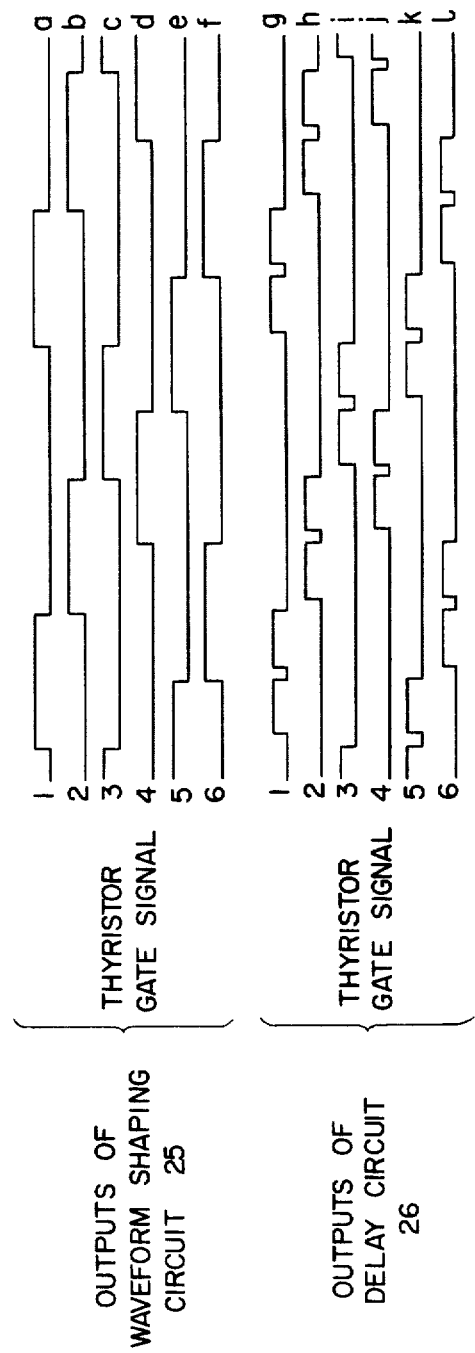

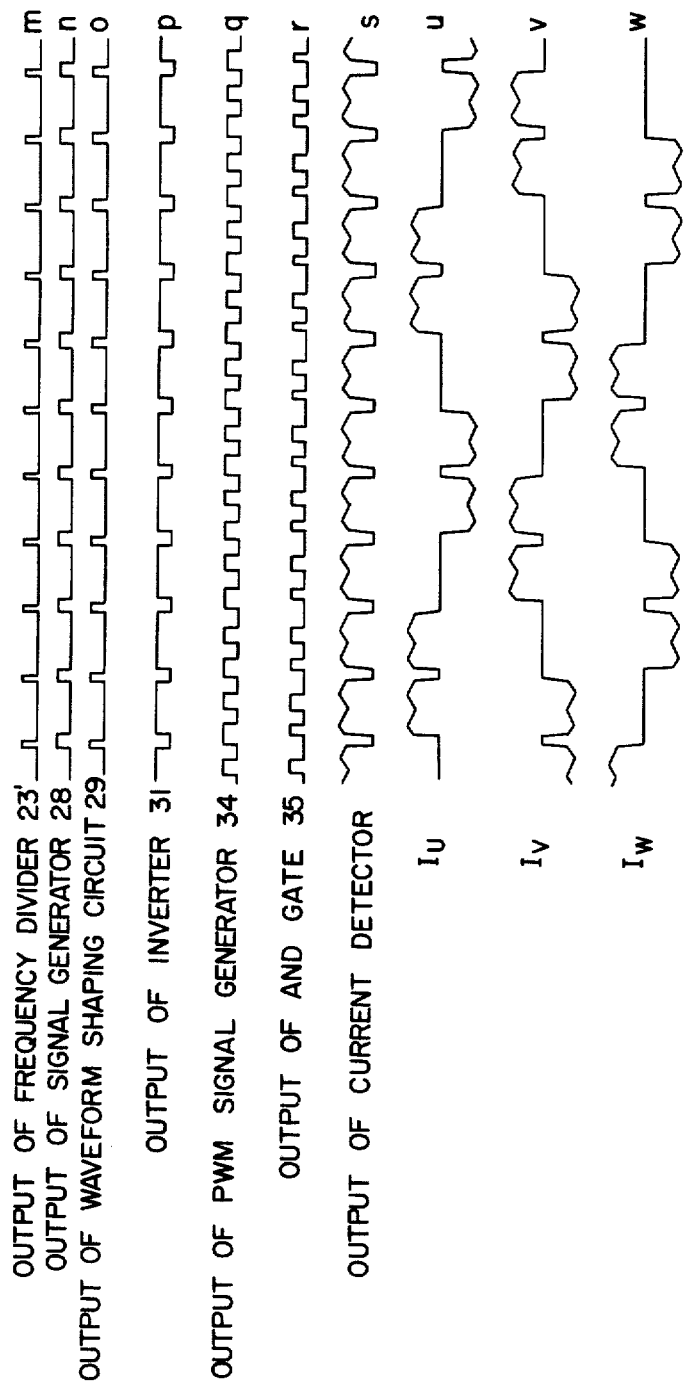

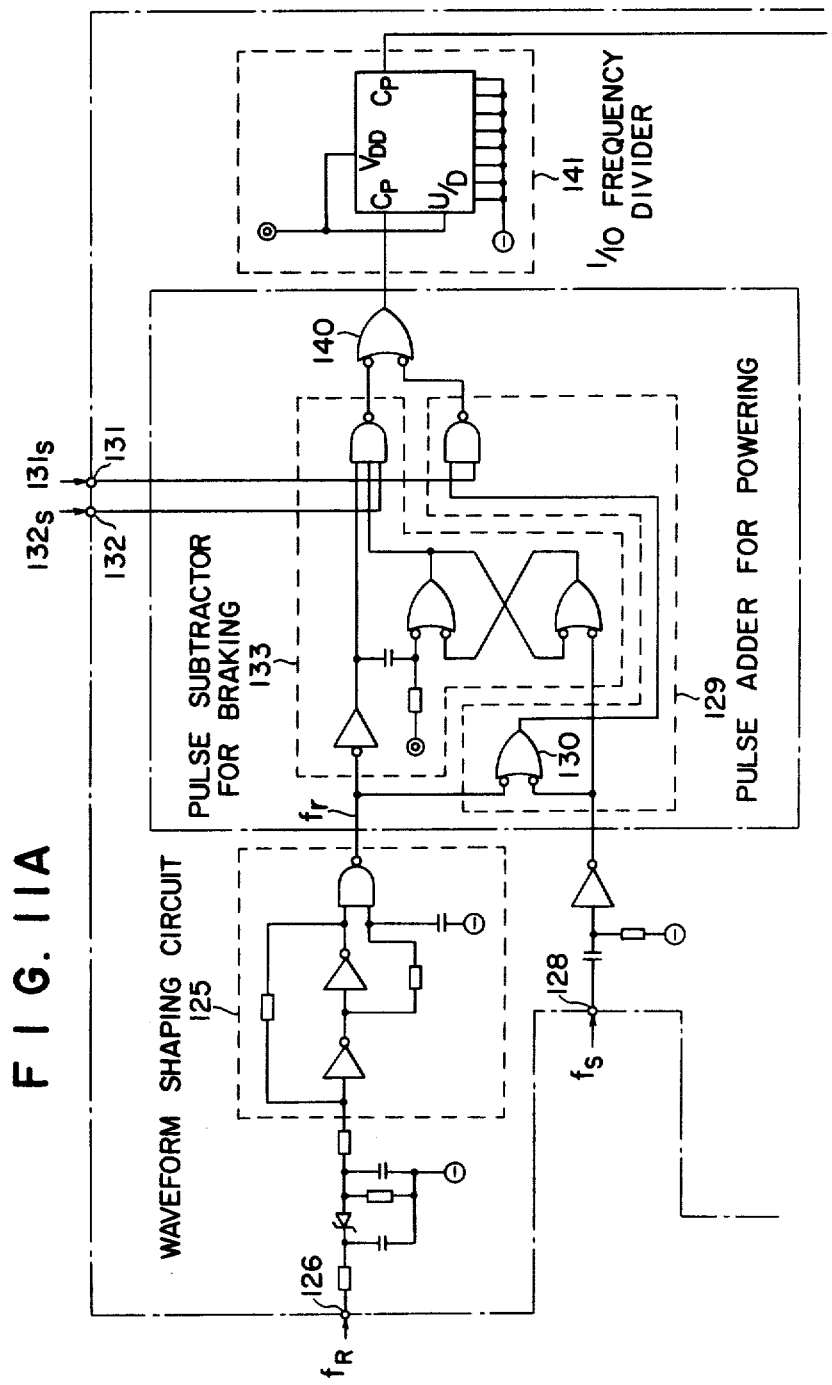
FIG. IIA

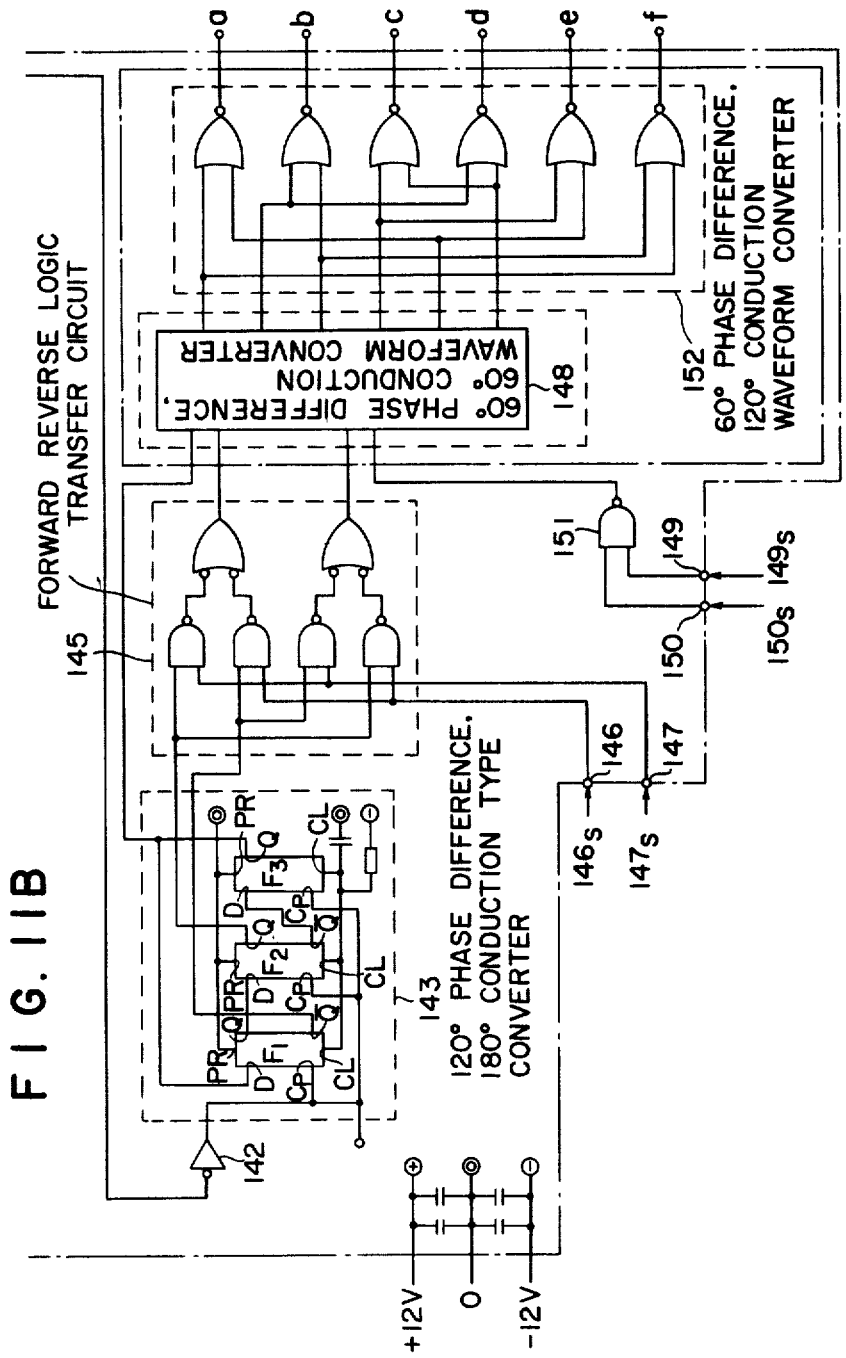
FIG. IIB

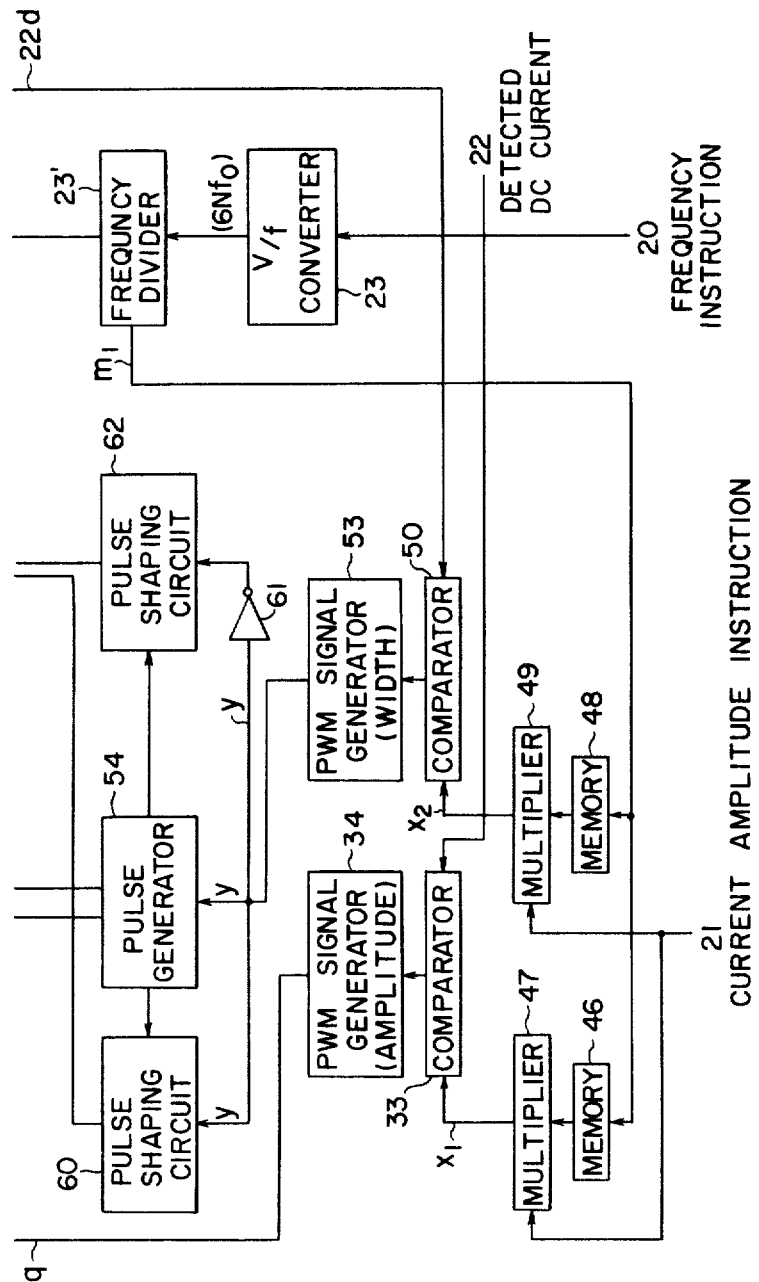

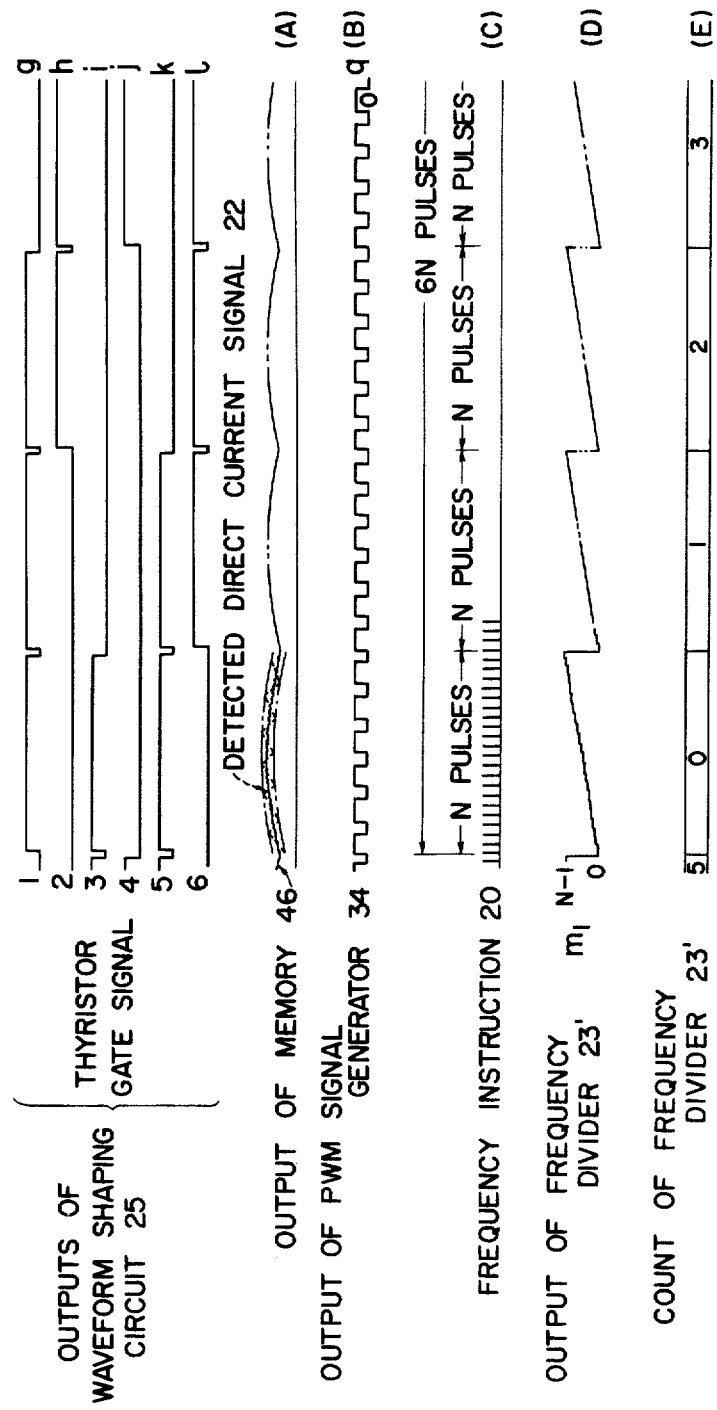

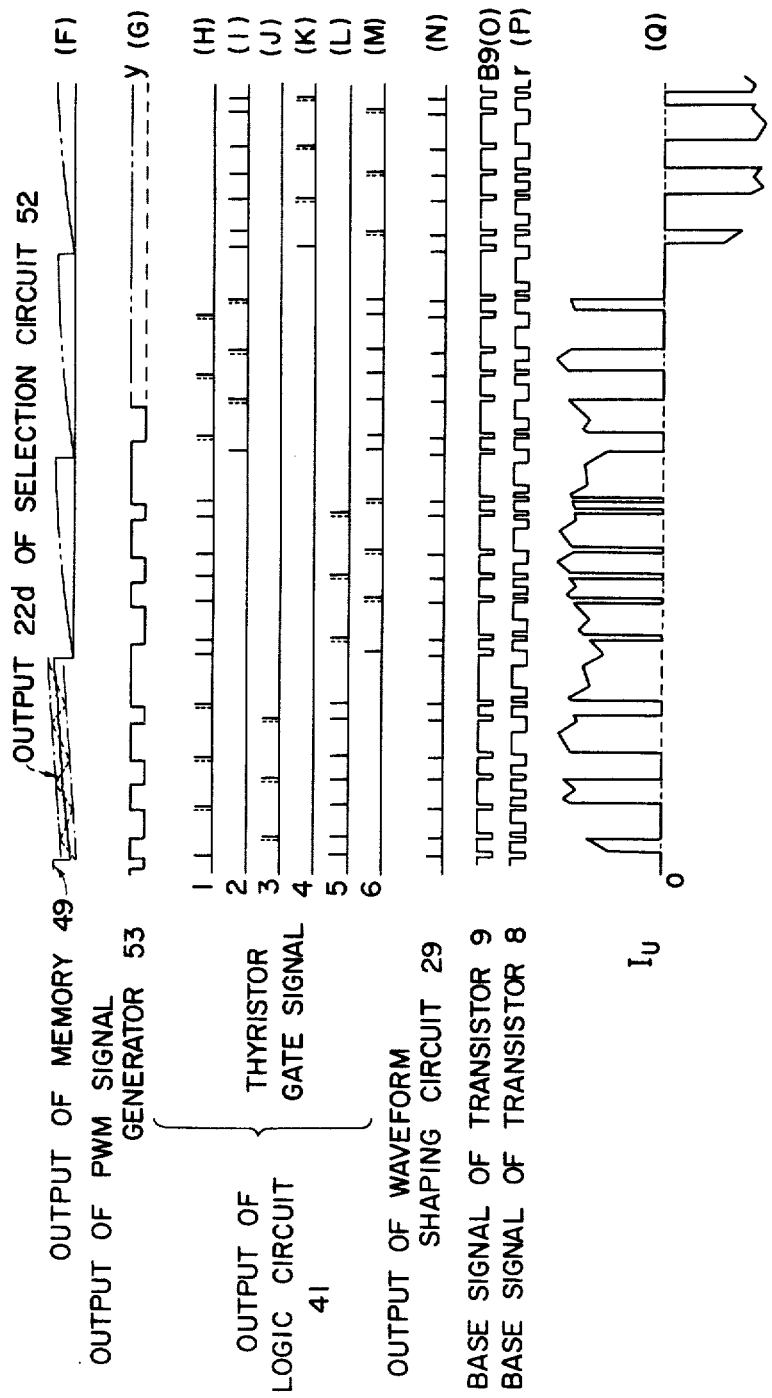

INVERTER APPARATUS

BACKGROUND OF THE INVENTION

This invention relates to inverter apparatus and, more particularly, to inverter apparatus of the simultaneous commutation type.

The inverter apparatus of this type is generally connected as shown in FIG. 1 for supplying three phase alternating current to a load L from a source of direct current connected to input terminals 15 and 16. More particularly, the inverter apparatus I comprises a bridge circuit including Graetz connected controlled semiconductor elements 1 through 6 (since thyristors are generally used, in the following description these elements are called thyristor), and a reverse bias circuit including a pair of power transistors 8 and 9 respectively connected in series with the DC side of the inverter and a pair of diodes 10 and 11 connected across the DC circuit. Diode 10 is connected between positive terminal 15 and the cathode side of thyristors 4, 5 and 6 whereas diode 11 is connected between the negative terminal 16 and the anode side of thyristors 1,2 and 3. Thyristor 7 and reactor 12 which form the subject matter of the invention will be described later. Current detectors 13, 13a', 13b' and 13c' are provided for the input and output sides of the bridge circuit for detecting direct current and alternating current respectively.

Single phase inverters shown in FIGS. 2 and 3 are also known.

Power transistors 8 and 9 are simultaneously turned OFF at the time of commutating current among thyristors thus causing simultaneous commutation.

In the inverter apparatus of the types described above, thyristors 1 through 6 are turned OFF by applying a reverse bias to the thyristors by utilizing the inverse recovery time of diodes 10 and 11. However, whether the commutation is carried out satisfactory or not is influenced by the characteristics of the diodes and thyristors.

More particularly, the term "inverse recovery time" generally means an interval between an instant when the forward current becomes zero and an instant at which a small current can flow in the reverse direction during a process in which a thyristor or diode recovers its reverse current blocking ability subsequent to the termination of the flow of the forward current and the length of such interval generally amounts to about 20 μs. Thus, the reverse current blocking ability is not recovered immediately after termination of the flow of the forward current and certain inverse recovery time $t_{REC}$ is necessary.

In the prior art inverter apparatus, since the inverse recovery times of the diodes 10 and 11 and of the thyristors 1 and 6 are substantially the same a reverse bias $V_B$ is applied to thyristors 3 and 4 but since the reverse blocking ability of the thyristors 1 and 6 are not yet recovered no reverse bias would be applied thereto thus often failing satisfactory turning OFF.

SUMMARY OF THE INVENTION

It is an object of this invention to provide an improved inverter apparatus capable of decreasing commutation period.

Another object of this invention is to provide an improved control circuit for inverter apparatus of the simultaneous commutation type which enables the inverter apparatus to operate with any one of various control modes.

According to this invention, there is provided an inverter apparatus of the type comprising a plurality of first controlled semiconductor elements connected between a direct current source and an alternating current load, a control circuit for sequentially turning ON and OFF the first controlled semiconductor elements acording to a predetermined sequence to convert direct current into alternating current, and a reverse bias circuit including a pair of second controlled semiconductor elements respectively connected in series with the direct current source and ON-OFF controlled by the control circuit for applying a reverse bias to the first controlled semiconductor elements to effect simultaneous commutation thereof, and a pair of diodes connected across the direct current source, wherein there are provided a third controlled semiconductor element connected between the first and second semiconductor elements and turned ON at the time of commutation of the first controlled semiconductor elements by the control circuit, and a reactor connected in parallel with the third controlled semiconductor element.

The control circuit for controlling the inverter apparatus comprises means for forming a frequency signal having a frequency related to an operating frequency of the inverter apparatus; means responsive to the frequency signal for generating a plurality of control signals having a predetermined phase difference and conduction intervals related to the ON-OFF operation of the first controlled semiconductor elements; a commutation synchronizing signal generator responsive to the frequency signal; a delay circuit connected between the first controlled semiconductor elements and the control signal generating means for delaying the control signals in response to the output of the commutation synchronizing signal generator thereby turning ON and OFF the first controlled semiconductor elements in accordance with a predetermined sequence; a pulse width modulation signal generator controlled by a predetermined instruction signal to produce a pulse width modulated signal; means responsive to an inverted output of the commutation synchronizing signal generator and the pulse width modulated signal for controlling one of the second controlled semiconductor elements; means responsive to the inverted output of the commutation synchronizing signal generator for controlling the other of the second controlled semiconductor elements; and means responsive to the frequency signal for controlling the third controlled semiconductor element.

BRIEF DESCRIPTION OF THE DRAWINGS

In the accompanying drawings:

FIG. 4 shows a current waveform showing the function of the commutating circuit;

FIGS. 5 and 6 are equivalent circuits for explaining the commutation operation of the inverter shown in FIG. 1;

FIGS. 8A and 8B show waveforms of various portions of the control circuit shown in FIG. 7;

FIGS. 11A and 11B are connection diagrams showing the detail of a portion of the control circuit shown in FIG. 10;

FIGS. 14A and 14B show a block diagram showing another example of the control circuit utilized in this invention; and FIGS. 15A and 15B show waveforms useful to explain the operation of the control circuit shown in FIGS. 14A and 14B.

DESCRIPTION OF THE PREFERRED EMBODIMENTS

Figure 1:
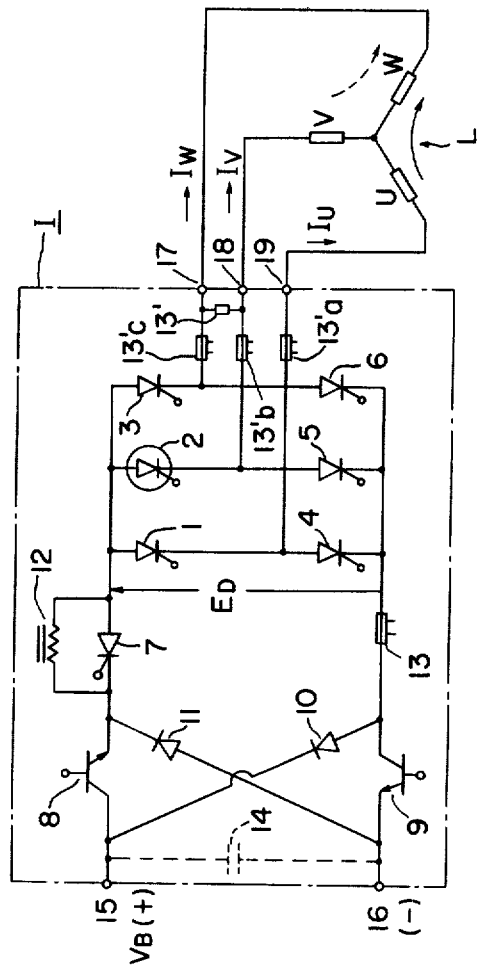
FIGS. 1, 2 and 3 are simplified connection diagrams showing various types of the inverter apparatus embodying the invention.

Turning now to the commutation circuit, a controlled semiconductor element 7, preferably a thyristor is connected between the power transistor 8 and the Graetz connected thyristors 1 through 6 and a reactor 12 is connected in parallel with thyristor 7. This circuit rapidly decreases the load current at the time of commutation thus decreasing overall commutation interval.

More particularly, FIG. 4 is a current waveform showing the relationship between load current variation and ON and OFF of power transistors 8 and 9, thyristor 7 and thyristors 2 and 6. Assume now that when thyristors 1 and 6 are ON, all thyristors 1 through 6 are simultaneously turned OFF for effecting commutation and that thyristors 2 and 6 are turned ON at the next instant. These conditions are diagrammatically shown in FIGS. 5 and 6, and the load current $i_S$ and the mean current $i_{LS}$ flowing through reactor 12 vary as shown in FIG. 4 in which $T_{CH}$ represents an OFF period, $T_c$ a commutation interval, $T_f$ a build down period, $T_r$ a build up period and $t_o$ a reverse bias period.

When power transistors 8 and 9 are turned ON while thyristor 7 is turned ON, the load current decreases rapidly during the build down period $T_f$ while the reactor current $i_{LS}$ continues to flow through a wheeling circuit including reactor 12 and thyristor 7. At the end of the OFF period $T_{CH}$, thyristors 2 and 6 are turned ON and power transistors 8 and 9 are also turned ON, whereby the load current $i_S$ builds up rapidly. After the build up period $T_r$, thyristor 7 is turned OFF thus communicating current from thyristor 1 to thyristor 2.

We prefer to use high response speed type controlled semiconductor elements as thyristors 1 through 6. The turn OFF time $t_Q$ of a common thyristor is about 150 μs and the inverse recovery time $t_{REC}$ thereof is about 20 μs. In contrast, in a high response speed type thyristor $t_Q = 15-30$ μs, and $t_{REC} = 2$ μs which are smaller by one order of magnitude than those of a common thyristor meaning excellent switching characteristic.

For example, in the inverter shown in FIG. 1, when thyristor 7 is turned ON while thyristors 1 and 6 are conductive and when transistors 8 and 9 are turned OFF, the load current flowing from phase U to phase W, that is the current flowing through thyristors 1 and 6 can rapidly be decreased to zero. Thus, where high response speed type thyristors are used, thyristors 1 and 6 can recover their reverse current blocking ability only after about 2 μs. Accordingly, during the recovery time of diodes 10 and 11, a reverse bias voltage $V_R = V_B/2$ is applied to thyristors 1 and 6 from a DC source having a voltage of $V_B$ through a circuit

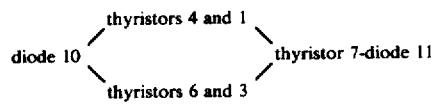

in a reverse bias time of $t_o = T_{CH} - T_f$ (where $T_{CH}$ represents the OFF time of thyristors and $T_f$ the current attenuation time). Thus, thyristors 1 and 6 are reversely biased to turn OFF.

Moreover, as the high response speed type thyristor has a short turn OFF time, it is possible to decrease the reverse bias time and hence to decrease the OFF period $T_{CH}$ thereof by about 120 μs, thus decreasing the OFF period of the load current.

The advantage of using such thyristors in a case where the load creates counter electromotive force will now be described.

During the commutation interval $T_c$ shown in FIG. 4 as the resistance components of the load and the inverter are negligibly small, the attenuating current $i_f$ and the build down or attenuation time $T_f$ are shown by the following equations (1) and (2).

$$i_f = I_{LS} - \frac{V_B + V_{UW}}{L} \cdot t \tag{1}$$

$$T_f = \frac{L \cdot I_{LS}}{V_B + V_{UW}} \tag{2}$$

As can be noted from equation (2) since the attenuation time $T_f$ is inversely proportional to the sum of the source voltage $V_B$ and the counter electromotive force $V_{UW}$, the attenuation time $T_f$ can be made to be extremely small.

Thereafter, when transistors 8 and 9 are turned ON again and thyristors 2 and 6 are turned ON, the load current increases rapidly, and an equivalent circuit under these conditions is shown by FIG. 6. This increasing current $i_r$ and the build up time $T_r$ are shown by the following equations (3) and (4).

$$i_r = \frac{V_B - V_{UW}}{L} \cdot t \tag{3}$$

$$T_r = \frac{L \cdot I_{LS}}{V_B - V_{UW}} \tag{4}$$

As can be noted from equation (4) as the difference between source voltage $V_B$ and the counter electromotive force $V_{UW}$ decreases, the build up time $T_r$ increases.

Where the counter electromotive force of the load has an effective value of E its value converted into a direct current voltage $E_D$ on the input side of a three phase inverter is expressed by an equation $$E_D = 1.35 \cos \theta_1 \cdot E$$

where $\theta_1$ represents a power factor angle.

A plurality of actually measured data show that the difference between the source voltage $V_B$ and the counter electromotive force $E_D$ should be at least 10% of the source voltage $V_B$.

For this reason, where the load creates a counter electromotive force the control system should be constructed to satisfy a relationship $$V_B - E_D \geq 0.1 V_B \tag{5}$$

When equation (5) is satisfied, it is possible to prevent increase in the current build up time $T_r$ shown in equation (4) so as to supply sufficiently large current to the load.

The control circuit of the inverter apparatus may be constructed as follows to accomplish various control modes.

Although power transistors 8 and 9 are used as the switching elements, any power type semiconductor switching elements such as gate turn OFF thyristors 10 can also be used provided that they can be turned ON and OFF by gate control.

I. Frequency/Current Control

Figure 7:
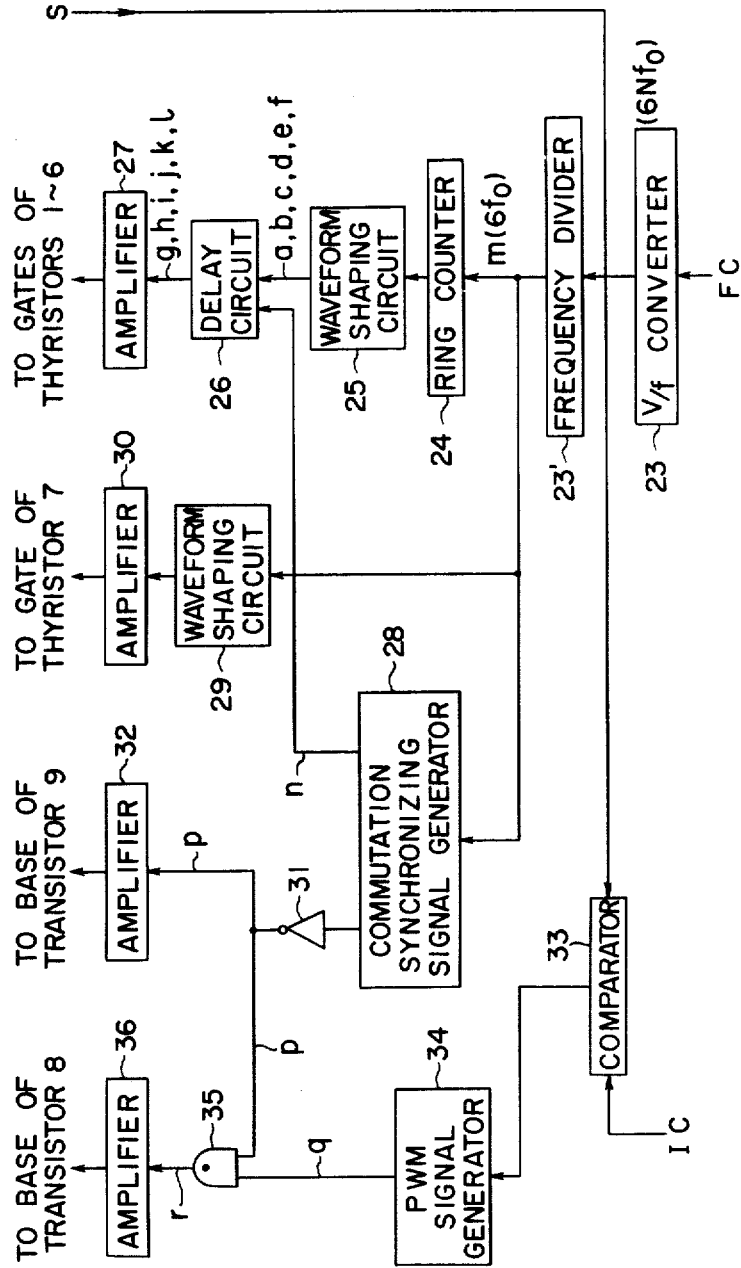
FIG. 7 is a block diagram showing one example of a control circuit utilized in this invention.

FIG. 7 is a block diagram showing a control circuit wherein the frequency and the output current of the inverter are controlled in accordance with a frequency instruction FC and a current instruction IC, and FIG. 8 shows waveforms at various portions of the control circuit.

A frequency instruction FC representing a reference frequency is applied to a voltage-frequency converter 23 and the output of the v/f converter 23 is applied to the gate electrodes of thyristors 1 through 6 through a frequency divider 23', a ring counter 24, a waveform shaping circuit 25, a delay circuit 26 and an amplifier 27 for turning ON the thyristors in accordance with a predetermined sequence. Thus, the frequency signal m produced by the frequency divider 23' is used as a shift pulse of ring counter 24 and the waveform of the output of the frequency divider 23' is shaped by a waveform shaping circuit 29, amplified by an amplifier 30 and then applied to the gate electrode of thyristor 7. The output m of the frequency divider 23' is also supplied to a commutation synchronizing signal generator 28 to generate a signal n which turns OFF the switching elements in synchronism with the commutation for a predetermined interval (interval of $T_{CH}$). The signal n is applied to the delay circuit 26 to produce a delayed signal and to an inverter 31 to produce an inverted signal p which is applied to the base electrode of transistor 9 (FIG. 1) via amplifier 32. The output p of the inverter 31 is also applied to one input of an AND gate circuit 35. The output S of the current detector 13 shown in FIGS. 1 and 2 and used to detect the DC input current is applied to a comparator 33 to be compared with a current instruction IC. The output of the comparator 33 is applied to a pulse width modulated (PWM) signal generator 34 to produce a pulse width modulated signal q which is applied to the other input of the AND gate circuit 35. The output r of the AND gate circuit 35 is applied to the base electrode of transistor 8 via an amplifier 36. The frequency/current control will be described with reference to FIG. 7, and in the following description the frequency of the load current is denoted by $f_o$ and the ratio of frequency division of the frequency divider 23' by 1/N.

To obtain the load frequency $f_o$, a frequency instruction FC in an analogue quantity is applied to the v/f converter 23, and a digital signal having a frequency of $6f_oN$ is applied to the frequency divider 23' from the v/f converter 23. Then the output signal m of the frequency divider 23' will have a frequency of $6f_o$. Where the v/f converter 23 is constructed to provide an output frequency of $6f_o$, the frequency divider 23' is not necessary. The output m having the frequency of $6f_o$ is applied to the ring counter 24 to act as a shift pulse. The ring counter 24 may comprise 3 stages for producing 3 digital control signals having a phase difference of 120° and each having a conduction interval of 180°, or 6 stages for producing 6 digital signals having a phase difference of 60° and each having a conduction interval of 60°.

The output of the ring counter 24 is applied to the waveform shaping circuit 25 to produce 6 control signals a through f, each having a conduction interval of 120° as shown in FIG. 8A.

Further, the output m of the frequency divider 23' is applied to the commutation synchronizing signal generator 28 which is constituted by a monostable circuit, for example, which produces a pulse having an off interval $T_{CH}$. The output pulse n of the commutation synchronizing signal generator 28 is applied to one input of the delay circuit 26 for delaying the control signals a through f produced by the waveform shaping circuit 25 to obtain signals g through l which are applied to the gate electrodes of thyristors 1 through 6 via amplifiers 27 and pulse transformers, not shown.

The output m of the frequency divider 23' is also applied to the waveform shaping circuit 29 to shape its width and then supplied to the gate electrode of thyristor 7 via the amplifier 30 and a gate transformer, not shown, each time the thyristor 7 is to be turned ON.

The output n of the commutation synchronizing signal generator 28 is applied to inverter 28 to obtain a phase inverted signal p which is applied to the base electrode of transistor 9 via amplifier 32. Since signal p becomes zero during intervals $T_{CH}$ in synchronism with the commutation, transistor 9 is positively turned OFF at each time of commutation.

The output current S of the input direct current detector 13 (FIG. 1) is compared with the current instruction IC by comparator 33 which provides a difference signal to the pulse width modulation (PWM) signal generator 34 to form a signal q shown in FIG. 8B.

The PWM signal may be generated by either a variable modulation frequency system in which the upper and lower set values of the comparator are varied in accordance with the current instruction for turning OFF the switching elements 8 and 9 at the upper set value and for turning ON them at the lower set value or a fixed modulation frequency system in which the inclination of the building up portion of a reference current pattern of a saw tooth waveform is varied in accordance with the current instruction and the resulting reference current pattern is compared with the detected current signal so as to vary the pulse width.

The output signal q of the PWM signal generator 34 and the output p of the inverter 31 are applied to the inputs of the AND gate circuit 35 which produces an output r shown in FIG. 8B and this output r is applied to the base electrode of transistor 8 via an amplifier 36 and a base driver transformer, now shown. Any other logic circuit can be substituted for the AND gate circuit 35 provided that the same logical operation can be provided. Even when the PWM signal q is "1" at the time of commutation, since the output p of inverter 31 is applied to one input of the AND gate circuit 35, the signal p is always "0" at the time of commutation so that the output r of the AND gate circuit 35 becomes "0". For this reason, at the time of commutation, like transistor 9, transistor 8 is turned OFF for an interval $T_{CH}$.

Consequently, the phase currents $I_U$, $I_V$ and $I_W$ are shown by waveforms u, v and w, respectively shown in FIG. 8B thus effecting satisfactory commutation.

II. v/f Control

Figure 9:
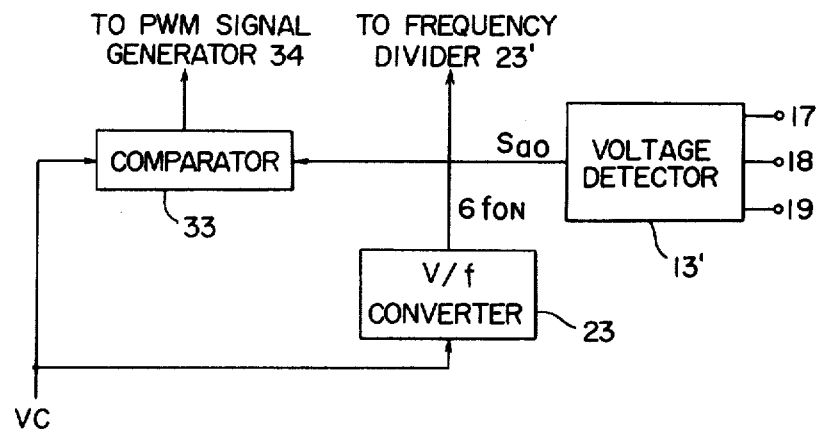
FIGS. 9 and 10 are block diagrams showing modified control circuits.

By modifying the signal input side of the control system shown in FIG. 7 as illustrated in FIG. 9, a v/f control can be attained in which the output voltage V and the output frequency of the inverter apparatus are made to be proportional.

More particularly, a voltage detector 13' is connected across output terminals 17, 18 and 19 of the inverter shown in FIG. 1 and the output of the voltage detector 13' is rectified and shaped to produce an inverter output voltage signal $S_{ao}$ which is applied to the input of the comparator 33 together with the voltage instruction vc thus producing a PWM signal q by the PWM signal generator 34. The voltage instruction vc is also applied to v/f converter 23 to produce a digital pulse signal having a frequency of $6f_oN$. As a consequence a proportional relationship holds between the output voltage v and output frequency f of the inverter thus effecting a v/f control.

III. Slip Frequency Control

Figure 10:
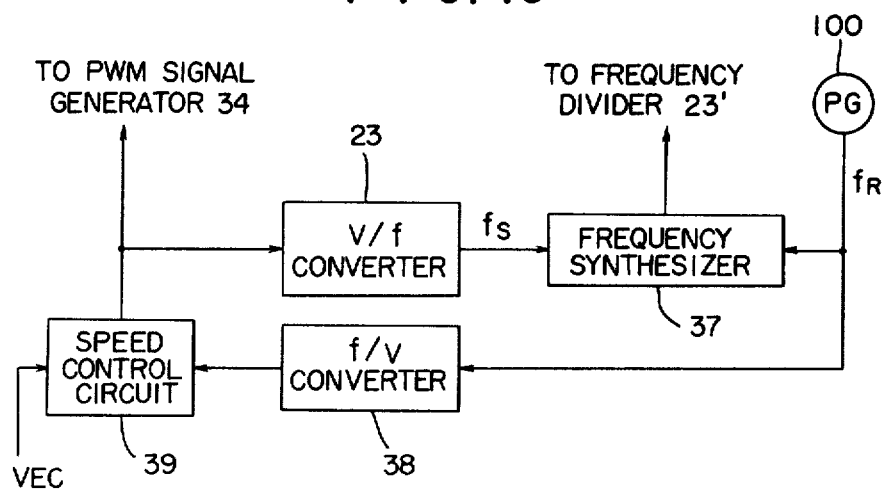

By modifying the signal input side of the control system as shown in FIG. 10, a slip frequency control can be effected for controlling the speed of the induction motor.

More particularly, as shown in FIG. 10, a pulse generator 100 is mounted on the shaft of the induction motor to produce a pulse signal $f_R$ having a frequency corresponding to the speed of the motor. The pulse signal $f_R$ is supplied to a frequency synthesizer 37 and a v/f converter 38 so as to obtain an analogue output proportional to the speed of the induction motor. This analogue output is compared with the speed instruction VEC by a speed control circuit 39. The output of the speed control circuit 36 is applied to the PWM signal generator 34 and to the v/f converter 23 which produces a digital pulse of a suitable pattern corresponding to the slip frequency. The output signal $f_S$ of the v/f converter 23 is applied to the frequency synthesizer 37 where it is added to the pulse signal $f_R$ generated by the pulse generator 100 during the powering operation of the motor, whereas subtracted from the pulse signal $f_R$ during braking. The output of the frequency synthesizer 37 is applied to the frequency divider 23' for providing a stable slip frequency control by the control circuit described above. The output of the speed control circuit 39 is applied to the PWM signal generator 34 to obtain a PWM signal which is applied to the base electrode of transistor 8 for controlling the speed of the induction motor.

FIGS. 11A and 11B, when combined, show one example of the frequency synthesizer 37 shown in FIG. 10 and the waveform shaping circuit 25 shown in FIG. 7.

The output $f_R$ generated by the tachometer generator 100 is applied to terminal 126 of the frequency synthesizer and shaped to have a narrow pulse width of about 5 μs by a waveform shaping circuit 125 including a differentiating circuit. Assume now that the motor has two poles, and an angular frequency of $f_w$, and that 60 pulses are produced per one revolution. Then the frequency $f_r$ of the pulse is $f_r = 60\ f_w$.

A pulse $f_s$ corresponding to the slip frequency and generated by a suitable oscillator, not shown, is applied to an input terminal 128 and then applied to a pulse adder 129 during powering together with the output $f_r$ of the waveform shaping circuit 125 through an OR gate circuit 130. A running instruction $131_s$ is applied to input terminal 131 to act as a level signal to cause the pulse adder 129 to count up. The frequency f' of the output of the adder 129 is expressed by an equation $$f' = f_r + f_s = 60(f_w + f_s) = 60f$$

where $f = f_w + f_s$.

At the time of braking, a braking instruction $132_s$ is applied to terminal 132 to actuate a pulse subtractor for braking 133 so as to subtract $f_s$ from $f_R$. At this time, the frequency f' of the output of the pulse subtractor 133 is expressed by $$f' = f_r - f_s = 60(f_w - f_s) = 60f$$

where $f = (f_w - f_s)$.

The output of the adder 129 and subtractor 133 are applied to a 1/10 frequency divider 141 via an OR gate circuit 140. Since the frequency divider 141 decreases the frequency to 1/10 (that is it procudes one count per 10 pulses), during powering the frequency of the output of the frequency divider 141 is $$f_c = 6f = 6(f_w + f_s)$$

whereas during braking $$f_c = 6f = 6(f_w - f_s)$$

where $f_c$ corresponds to the commutation frequency of the inverter and f the output frequency thereof.

The output of the frequency divider 141 is applied to a 120° phase difference, 180° conduction type converter 143 via an inverter 142 to produce three output signals having a phase difference of 120° and a 180° conduction interval. The converter 143 comprises three cascade connected flip-flop circuits $F_1$, $F_2$ and $F_3$, and the output of inverter 142 is applied to terminals $C_p$ of the flip-flop circuits to act as a clock pulse. The flip-flop circuits are cleared by a single shot timing pulse applied to their CL terminals. The output of the converter 143 is used to produce a transistor OFF pulse which turns OFF transistors 8 and 9 at each commutation period for forming the OFF period $T_{CH}$, a timing pulse which turns ON two out of 6 thyristors 1 through 6 immediately following the OFF period $T_{CH}$, and a pulse which is synchronous with the OFF period $T_{CH}$ and used to turn ON thyristor 7 thereby short circuiting the smoothing reactor 12.

The three outputs produced by the converter 143 are applied to a forward/reverse transfer logic circuit 145. During the forward rotation, a forward instruction signal $146_s$ is applied to terminal 146 to act as a step signal whereby the forward/reverse logic transfer circuit 145 produces three outputs having a phase difference of 120° and a 180° conduction interval. On the other hand, durng the reverse rotation, a reverse instruction signal $147_s$ is applied to input 147 to that the phase rotation of the three outputs is reversed. These three outputs correspond to the outputs of the position detectors of a so-called thyristor motor.

The outputs of the forward/reverse logic transfer circuit 145 is applied to a 60° phase difference, 60° conduction type waveform converter 148 to produce 6 signals having a 60° phase difference and a 60° conduction interval. A timing pulse $149_s$ is applied to terminal 149 and a multi-trigger pulse $150_s$ is applied to terminal 150 for rendering easy the operation of the gate transformers (not shown) connected to the gate electrodes of thyristors 1 through 6. The timing pulse $149_s$ is formed by a monostable circuit, not shown, connected to the output of inverter 142 and has a width of $T_{CH}$. The pulses $149_s$ and $150_s$ are appled to the 60° phase difference, 60° conduction waveform converter 148 via a NAND gate circuit 151. Consequently, the 6 outputs of the waveform converter 148 have waveforms determined by the timing pulse $149_s$ and the multi-trigger pulse $150_s$ having a frequency of 50 KHz for example. When pulses $149_s$ and $150_s$ are interrupted by a logic circuit, not shown, all of the 6 output signals become zero thus supplying no gate current to the thyristors.

The 6 output signals of the waveform converter 148 are applied to a 60° phase difference 120° conduction type waveform converter 152 to produce 6 gate signals a through f which are supplied to the gate electrodes of the thyristors 1–6 through gate transformers thus turning ON the thyristors according to a predetermined sequence.

Although the frequency synthesizing circuit 37 of the digital type has been described hereinabove, it will be clear that it may be of an analogue type.

IV. Current Conduction Interval

The foregoing description relates to a 120° conduction system wherein the width (ON period of the thyristor 7) is controlled by a PWM signal to repeat a conduction mode and a circulation mode (in which current circulates through the reactor 12 during the OFF period) thereby obtaining a 120° square wave current.

Figure 12:
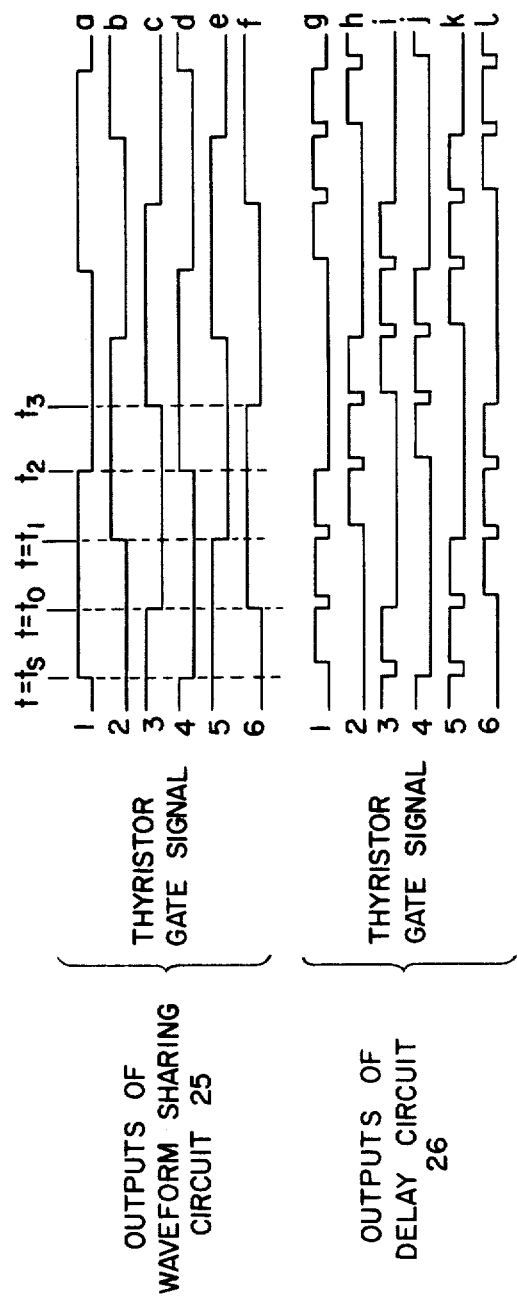
FIG. 12 shows waveforms useful to explain the operation of the waveform shaping circuit and the delay circuit shown in FIG. 7.

In the inverter of this invention too it is possible to pass current for 180° by adding one input to each OR gate circuit of the waveform shaping circuit 25. The outputs a–f of the waveform shaping circuit 25 and the outputs g–l of the delay circuit 26 for 180° conduction are shown in FIG. 12. By using these outputs, a current control (PWM control) similar to the 120° conduction control shown in FIGS. 8A and 8B can be made.

In a three phase inverter, for 120° conduction two thyristors on the upper and lower sides are always conducting but in the case of 180° conduction 3 out of 6 thyristors are conducting according to a predetermined gate control sequence. For example, at an instance immediately before $t=t_1$ shown in FIG. 12, thyristors 1, 5 and 6 are ON so that instead of a 180° rectangular current wave, somewhat distorted waveform would be resulted.

In the case of the 180° conduction, it is desirable that the output of the inverter should have a waveform similar to a sine wave or a trapezoidal wave (for the load, an output wave containing less quantity of higher harmonic components is desirable).

As an example of obtaining an output current waveform of any function from the inverter apparatus by effecting a PWM control, one example of an inverter control system for obtaining a sine wave output current will be described hereunder.

Figure 13:
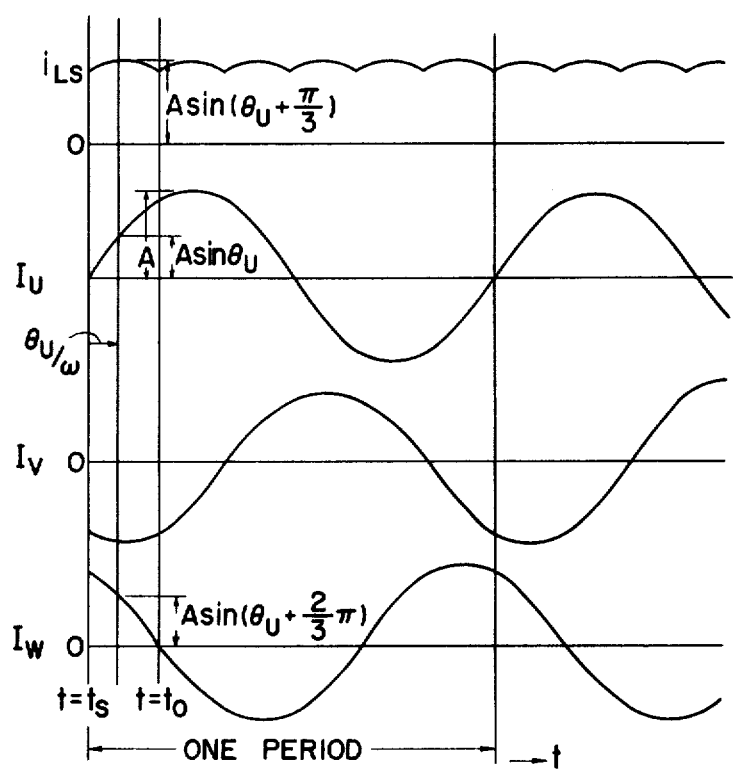
FIG. 13 shows sine wave output currents of the inverter.

Considering a 60° electric angle between instants $t_s$ and $t_o$ shown in FIG. 13, it is necessary to satisfy the following relationships:

$$\left. \begin{array}{l} I_u = A \sin \theta_u \\ I_v = A \sin (\theta_u - \tfrac{2}{3}\pi) \\ I_w = A \sin (\theta_u + \tfrac{2}{3}\pi) \end{array} \right\}$$

where $\theta_u$ represents an electrical angle after initiating the commutation at $f=t_s$, and A the amplitude of the sine wave load current. At the same time, it is necessary to control the direct current $i_s$ to vary sinusoidally by controlling gate turn OFF power semiconductors.

By denoting the currents flowing through thyristors 1, 3 and 5 by $I_1$, $I_3$ and $I_5$, respectively, then $$I_1 = I_u, \; I_5 = -I_v, \; I_3 = I_w$$

$$i_{LS} = I_1 + I_2 = I_5 = -I_v$$

consequently, by putting $$\left\{ \begin{array}{l} i_s = -A \sin (\theta_u - \tfrac{2}{3}\pi) = A \sin (\theta_u + \tfrac{\pi}{3}) \\ I_1 = A \sin \theta_u \end{array} \right. \text{or}$$

$$i_s = A \sin (\theta_u + \tfrac{\pi}{3})$$
$$I_3 = A \sin (\theta_u + \tfrac{2}{3}\pi)$$

the load current becomes sinusoidal during an interval $t_o$–$t_1$. By controlling successive phases in the same manner, an ideal sinusoidal current can be obtained. Accordingly, for the purpose of causing the direct current $i_s$ and currents of two phases during the overlapping period (during the interval between $t_s$ and $t_o$ shown in FIG. 13, phases U and W) to approach the waveform shown in FIG. 13, an additional control circuit is provided as follows.

(A) The current $i_s$ is made to have a waveform shown in FIG. 13 by the chopping action of the switching element. Thus, by repeating the conduction mode and the circulation mode and by controlling the instantaneous value of the current by the switching element the waveform of current $i_s$ becomes sinusoidal.

(B) With regard to the currents of two phases in an overlapping period, two among 6 thyristors (during an interval between $t_s$ and $t_o$ shown in FIG. 13) are alternately turned ON by PWM signals so as to cause the phase currents to become close to sinusoidal currents. However, since the inverter of this invention is of the simultaneous commutation type, for alternately turning ON two thyristors a commutation mode is provided in which thyristors 8 and 9 are turned OFF and thyristor 7 is turned ON.

(C) The normal commutation mode for 120° or 180° conduction is made in the same manner as in a prior art inverter.

V. Sine Wave PWM Control

Figure 14A:
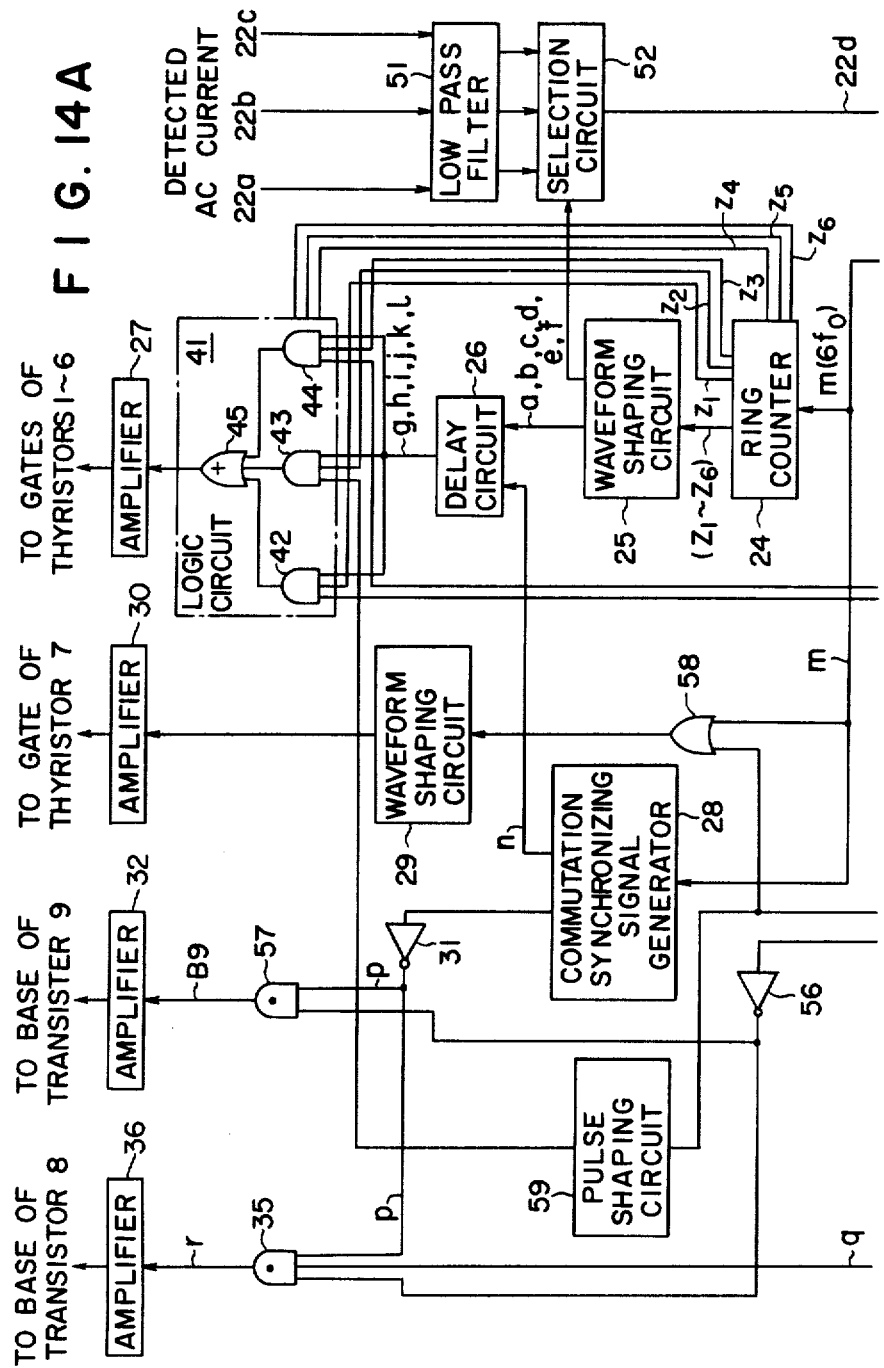

The construction of the control circuit for obtaining a sine wave described in paragraph IV is shown in FIGS. 14A and 14B in which elements corresponding to those shown in FIG. 7 are designated by the same reference characters, and the waveforms at various portions are shown in FIG. 15.

More particularly, a logic circuit 41 including three AND gate circuits 42, 43 and 44 and one OR gate circuit 45 connected to the outputs of these AND gate circuits is connected between delay circuit 26 and amplifier 27 for commutating the current among 6 thyristors 1 through 6 by the PWM control wherein the 180° conduction period is divided into an initial 60° (AND gate circuit 42), an intermediate 60° (AND gate circuit 43) and a last 60° (AND gate circuit 44) by the action of the delay circuit 26 so as to include the OFF period $T_{CH}$ in each commutation mode. Although only one logic circuit is shown, actually six logic circuits are necessary. Ring counter 24 produces 6 signals $z_1$–$z_6$ which are dephased 60° and each having 60° interval and these signals are applied to the logic circuit 41. For example, signal $z_1$ is applied to AND gate circuit 42 and signals $z_2$ and $z_3$ are applied to AND gate circuits 43 and 44 respectively.

The frequency divider 23' comprises a so-called N step counter (N is an integers which produces $m_1$ digital outputs corresponding to its counts, the count being proportional to the phase angle ($\theta_u$ shown in FIG. 13) subsequent to the initiation of the overlapping. This relationship is shown by FIG. 15A–D. By writing this digital output $m_1$ in the addresses of a read only random access memory device 46 in which a pattern of a portion of a sine wave has been written and in the addresses of a random access memory device 48, it is possible to produce sinusoidal waves having amplitudes corresponding to the outputs $\theta_u$ of respective memory devices 46 and 48. These digital output signals and a current amplitude instruction 21 are applied to multipliers 47 and 49 which also convert analogue quantities into digital quantities to produce sinusoidal analogue outputs $x_1$ and $x_2$ shown by FIGS. 15A—A and the solid line of 15F, respectively.

The load currents $I_u$, $I_v$ and $I_w$ are detected by current detectors 13a', 13b' and 13c' (FIG. 1) and applied to a selection circuit 52 via a low pass filter 51. The selection circuit 52 selects and produces a mean value of the currents of two phases during the overlapping period. The selection instruction is applied to the selection circuit 52 by the outputs a through f of the waveform shaping circuit 25. A pulse signal produced by the 6 step ring counter 24 can also be used as the selection instruction. The output waveform of the selection circuit 52 is shown by dotted lines shown by FIG. 15B-F. On the other hand, the direct current input current $i_s$ to the inverter is detected by the current detector 13 (FIG. 1) and its output 22 is shaped by the PWM signal generator 34 to have a waveform close to a sine wave as shown by the dotted line shown in FIG. 15A.

The output 22 of the direct current detector and the output 22d of the selection circuit 52 are applied to comparators 33 and 50 respectively to be compared with sinusoidal outputs $x_1$ and $x_2$ respectively produced by multipliers 47 and 49. The differences between signals 22 and $x_1$ and between signals 22d and $x_2$ are applied to PWM signal generators 34 and 53 respectively for producing PWM switching signals q and y. Comparators 33 and 50 may be constituted by Schmidt trigger circuits and produce MWM control signals q and y in accordance with the width of signal n. Signal q is applied to one input of an AND gate circuit 35 to ON-OFF control, through an amplifier 36, transistor 8 so as to approximate direct current $i_s$ to a sine wave shown by FIG. 15A—A.

Signal y is applied to a pulse generator 54 which generates a pulse having a width $T_{CH}$ and synchronized with the PWM control signal and to a pulse shaping circuit 60. Signal Y is also applied to a pulse shaping circuit 62 after being inverted its phase by an inverter 61. The output of the pulse generator 54 is applied to the other inputs of AND gate circuits 35 and 57 through an inverter 56 and to pulse shaping circuits 60 and 62 for delaying the outputs thereof by $T_{CH}$. The pulse shaping circuits 60 and 62 operate to shape the widths of the output signals to be equal to the gate pulse width suitable for triggering thyristors 1 through 6.

The output of the shaping circuit 60 is applied to one input of AND gate circuit 42 for the initial 60° whereas the output of the pulse shaping circuit 62 is applied to one input of the AND gate circuit 44 for the last 60°. The output of the pulse generator 54 is applied to a pulse shaping circuit 59 which is constituted by a monostable circuit or the like to form a pulse having a desired width. The output of the pulse shaping circuit 59 is applied to one input of AND gate circuit 43 for the intermediate 60°. The output of the pulse generator 54 is also applied to one input of an OR gate circuit 58 together with the frequency signal m generated by the frequency divider 23'. The output of the OR gate circuit 58 is applied to the gate electrode of thyristor 7 via amplifier 30 and a waveform shaping circuit 29 which generates a rectangular waveform.

Figure 2:
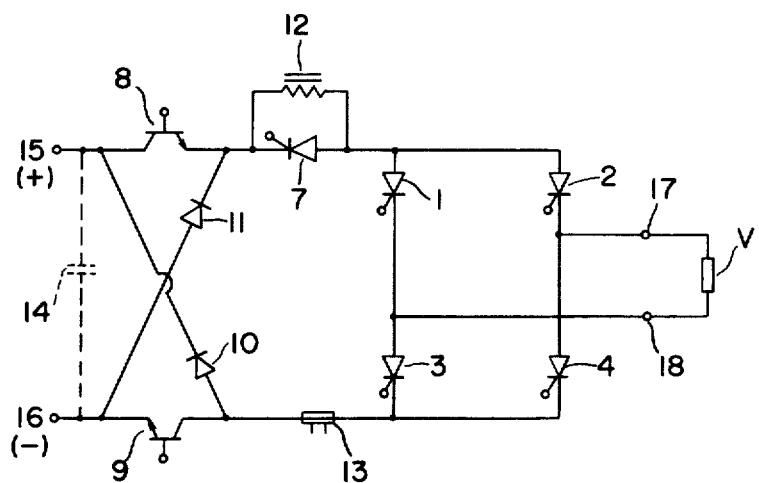
Figure 3:
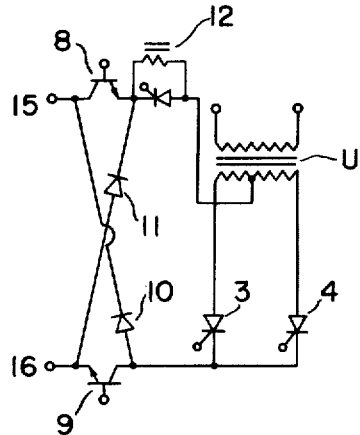

With the control system described above, and by effecting PWM control, inverters shown in FIGS. 1 and 2 can supply sinusoidal currents to the load.

The output signal q of the PWM signal generator 34 is shown by FIG. 15A-B and the output signal y of the PWM signal generator 53 is shown by FIG. 15B-G. The output signal $B_9$ of AND gate circuit 57 (base signal of transistor 9) and the output signal r of AND gate circuit 35 are shown by FIGS. 15O and 15P respectively. The gate signals of thyristors 1-6, and 7 are shown by FIGS. 15H through 15N respectively. In this manner, the load current $I_u$ becomes a sinusoidal wave as shown by FIG. 15B-Q.

Gate signals of thyristors 1-6 shown by dotted lines in FIGS. 15B-H through 15B-M show the phase positions of the gate pulses where there is no delay.

The PWM control described above can also be applied to control systems shown in FIGS. 9 and 10 for effecting v/f control and slip frequency control, respectively.

It is possible to produce inverter outputs having any desired waveform (trapezoidal wave or trapezoidal wave approximating a sine wave) by suitably varying the patterns of the functions written in the random access memory devices 46 and 48 shown in FIGS. 14A and 14B. Further, the signals generated by control circuits shown in FIGS. 7, 9, 10 and 14 are applied to the base electrodes of transistors 8 and 9. The transistor 9 may be used as a chopper. Alternatively, transistors 8 and 9 may be operated alternately or may operate as so-called alternate choppers by interchanging the gate signals of transistors 8 and 9 each time a PWM signal is produced. With this measure it is possible to avoide overheating by making equal the switching frequencies of transistors 8 and 9.

Summarizing the above, the invention is characterized by the reactor 12 and the short circuiting thyristor 7 which are connected in circuit with the inverter circuit. During the commutation period in which inverter thyristors 1-6 (FIG. 1) are all turned OFF, thyristor 7 is turned ON to pass current $I_O$ through a circulating path including reactor 12 and thyristor 7 by the electromagnetic energy stored in the reactor 12 thus maintaining the load current at a constant value. Furthermore, short circuiting of the reactor 12 greatly decreases the inductance of the inverter circuit so that the build down period of the load current is decreased thus ensuring satisfactory commutation. Immediately after the commutation, all inverter thyristors 1-6 are turned ON. At this time since current $I_o$ is flowing through the short circuiting circuit the reactor 12 does not delay the build up of the load current, the build up being governed only by a small inductance of the load. Rapid build up means the ability of supplying more power to the load.

During the interval other than the commutation period, since the reactor 12 is connected in series with the load circuit, it prevents rapid change of the load current. During regeneration a portion of the regenerated power is stored in the reactor 12 and returned to the source when thyristor 7 is turned OFF. Thus a substantially constant current flows through the reactor during the operation of the inverter including the commutation period thus assuring smooth transfer of electric power between the source and the load. Moreover as the reactor prevents rapid change in the load current which renders easy the current control.

What is claimed is:

1. In an inverter apparatus of the type comprising a plurality of first controlled semiconductor elements connected between a direct current source and an alternating current load, a control circuit for sequentially turning ON and OFF said first controlled semiconductor elements according to a predetermined sequence to convert direct current into alternating current, and a reverse bias circuit including a pair of second controlled semiconductor elements respectively connected in series with said direct current source and ON.OFF controlled by said control circuit for applying a reverse bias to said first controlled semiconductor elements to effect simultaneous commutation thereof, and a pair of diodes connected across said direct current source, and a third controlled semiconductor element connected between said first and second semiconductor elements and turned ON at the time of commutation of said first controlled semiconductor elements by said control circuit, and a reactor connected in parallel with said third controlled semiconductor element, said control circuit comprising:
   means for forming a frequency signal having a frequency related to an operating frequency of said inverter apparatus,
   means responsive to said frequency signal for generating a plurality of control signals having a predetermined phase difference and conduction intervals related to the ON.OFF operation of said first controlled semiconductor elements,
   a commutation synchronizing signal generator responsive to said frequency signal,
   a delay circuit connected between said first controlled semiconductor elements and said control signal generating means for delaying said control signals in response to the output of said commutation synchronizing signal generator thereby turning ON and OFF said first controlled semiconductor elements in accordance with a predetermined sequence,
   a pulse width modulation signal generator controlled by a predetermined instruction signal to produce a pulse width modulated signal,
   means responsive to an inverted output of said commutation synchronizing signal generator and said pulse width modulated signal for controlling one of said second controlled semiconductor elements,
   means responsive to the inverted output of said commutation synchronizing signal generator for controlling the other of said second controlled semiconductor elements, and
   means responsive to said frequency signal for controlling said third controlled semiconductor element.

2. The inverter apparatus according to claim 1 wherein said control circuit further comprises a voltage-frequency converter responsive to a frequency instruction, and a frequency divider for dividing the frequency of the output of said voltage-frequency divider to obtain said frequency signal.

3. The inverter apparatus according to claim 1 wherein said control signal generating means comprises a multistage ring counter and said frequency signal is applied to said ring counter to act as a shift pulse.

4. The inverter apparatus according to claim 1 wherein said control circuit further comprises a comparator which compares a predetermined current instruction with direct current flowing through said inverter apparatus, and means for supplying the output of said comparator to said pulse width modulation signal generator.

5. The inverter apparatus according to claim 4 wherein said pulse width modulation signal generator comprises a variable modulation frequency system wherein upper and lower set values of said comparator are varied in accordance with said current instruction for turning OFF said second controlled semiconductor elements at an upper set value and turning ON the same at the lower set value.

6. The inverter system according to claim 4 wherein said pulse width modulator system comprises a fixed modulation frequency system in which inclination of a building up portion of a reference current pattern of a saw tooth waveform is varied in accordance with the current instruction and the resulting reference current pattern is compared with said direct current so as to vary the width of the pulse generated by said pulse width modulation signal generator.

7. The inverter apparatus according to claim 1 wherein said control circuit further comprises a comparator which compares a predetermined voltage instruction with the output AC voltage of said inverter apparatus for controlling said pulse width modulation signal generator, and a voltage-frequency converter supplied with said voltage instruction to generate said frequency signal.

8. The inverter apparatus according to claim 1 wherein said control circuit further comprises means for producing a signal representing a speed of an induction motor driven by said inverter apparatus, a speed control circuit responsive to said signal and a predetermined speed instruction to produce an output supplied to said pulse width modulation signal generator, a voltage-frequency converter responsive to the output of said speed control circuit for producing a signal corresponding to a slip frequency of said induction motor, a frequency synthesizer responsive to said slip frequency signal and a signal having a frequency corresponding to a speed of said induction motor, and means for applying the output of said frequency synthesizer to said frequency signal forming means.

9. The inverter apparatus according to claim 1 wherein said control circuit further comprises:
   a logic circuit interposed between said delay circuit and said first controlled semiconductor elements,
   a further pulse width modulation signal generator for controlling said logic circuit,
   memory means for storing a portion of a sine wave,
   means responsive to the output of said memory means and a predetermined current amplitude instruction to produce a sinusoidal output, a selection circuit which produces a mean value of the alternating currents of two phases during an overlapping period, means responsive to the direct current flowing through the inverter apparatus and said sinusoidal output for controlling said first mentioned pulse width modulation signal generator, means responsive to the output of said selection circuit and said sinusoidal output for controlling said first controlled semiconductor elements through said logic circuit and for controlling said second and third controlled semiconductor elements thereby approximating said direct current and said alternating current to a sine wave.

10. A control circuit for an inverter, said inverter having a plurality of thyristors for sequentially connecting a d.c. voltage supply to an induction motor through a pair of switching members and a reverse bias circuit for inhibiting the conduction of said thyristors, comprising:

- a parallel network comprising a thyristor and inductor, said netword being serially located between one of said switching members and said plurality of thyristors;
- a frequency generator for providing a signal having a frequency representative of the operating frequency of said inverter in response to a frequency instruction;
- means for producing a plurality of gating signals for enabling said plurality of thyristors in response to a signal from said frequency generator, whereby said plurality of thyristors are enabled at a predetermined frequency and sequence;
- means for generating an inhibiting pulse for inhibiting conduction of one of said switching members in synchronism with said frequency;
- means for delaying said plurality of gating signals in response to said inhibiting pulse;
- means for enabling said parallel connected thyristor in synchronism with said frequency generator output signal;
- a pulse width modulator for providing a pulse width modulated signal in accordance with a current controlling signal; and
- means for inhibiting conduction of said remaining switching member in response to the concurrence of a pulse produced from said pulse width modulator and an inhibiting pulse.

11. The control circuit of claim 10, wherein said current controlling signal is provided by a comparator, said comparator providing a signal proportional to the difference between a detected current supplied to said induction motor and a current instruction.

12. The control circuit of claim 10, further comprising means for controlling the speed of said induction motor, comprising:

- means for providing a reference signal having an frequency proportional to the speed of said induction motor;
- means for generating a current controlling signal for said pulse width modulator in response to the difference between the speed of said motor and a selected speed;
- means for generating a slip frequency signal in response to the difference between said selected speed and the speed of said motor;
- means for combining said reference signal with said slip frequency signal; and
- means for controlling the frequency of said frequency generator in response to said combined reference signal and slip frequency signal.

* * * * *